US012460715B2

(12) United States Patent
Lister et al.

(10) Patent No.: US 12,460,715 B2
(45) Date of Patent: Nov. 4, 2025

(54) LUBRICATION SYSTEM FOR A TRACTION POWERTRAIN

(71) Applicant: Caterpillar Inc., Peoria, IL (US)

(72) Inventors: Brian E. Lister, Edwards, IL (US); Michael D. Beyer, Chillicothe, IL (US); Alex M. Fullenkamp, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 393 days.

(21) Appl. No.: 17/966,056

(22) Filed: Oct. 14, 2022

(65) Prior Publication Data

US 2024/0125381 A1    Apr. 18, 2024

(51) Int. Cl.
*E02F 9/20* (2006.01)
*F16H 57/04* (2010.01)
*F16H 59/18* (2006.01)
*F16H 59/40* (2006.01)
*F16H 59/42* (2006.01)
*F16H 59/70* (2006.01)
*F16H 61/00* (2006.01)

(52) U.S. Cl.
CPC ......... *F16H 57/0439* (2013.01); *E02F 9/202* (2013.01); *E02F 9/2095* (2013.01)

(58) Field of Classification Search
CPC ...... F16H 57/0439; E02F 9/202; E02F 9/2095
See application file for complete search history.

(56) References Cited

U.S. PATENT DOCUMENTS

| | | | |
|---|---|---|---|
| 9,022,165 B2 * | 5/2015 | Sah | B60W 10/30 180/65.265 |
| 9,074,596 B2 | 7/2015 | Miyamoto | |
| 9,234,579 B2 | 1/2016 | Miyamoto | |
| 9,834,217 B2 | 12/2017 | Gibson et al. | |
| 9,897,194 B2 * | 2/2018 | Barone | F16H 57/0435 |
| 10,737,700 B2 | 8/2020 | Wang et al. | |
| 2014/0010668 A1 * | 1/2014 | Sah | F16H 61/0021 903/915 |
| 2015/0226319 A1 * | 8/2015 | Miyamoto | F16H 57/0413 701/58 |
| 2020/0362958 A1 | 11/2020 | Sauter et al. | |

FOREIGN PATENT DOCUMENTS

DE    102013212027 A1    1/2014
EP    3139068    3/2017

OTHER PUBLICATIONS

Written Opinion and International Search Report for Int'l. Patent Appln. No. PCT/US2023/074528, mailed Jan. 17, 2024 (14 pgs).

* cited by examiner

*Primary Examiner* — Scott A Browne
*Assistant Examiner* — Rami Nabih Bedewi
(74) *Attorney, Agent, or Firm* — Leydig, Voit & Mayer, LTD.

(57) ABSTRACT

A mobile machine can include a traction powertrain configured to operate on electrical power and which includes a traction motor coupled to a transmission. To lubricate the transmission, the mobile machine can include a lubrication system having a lubricant pump coupled with a pump motor. The traction motor and the pump motor are electrically arranged in parallel with each other. A powertrain sensor monitors rotational motion in the traction powertrain and an electronic controller can generate a lubricant supply command directing the lubricant pump to deliver a first lubricant quantity to the transmission.

13 Claims, 4 Drawing Sheets

LUBRICATION SYSTEM FOR A TRACTION POWERTRAIN

TECHNICAL FIELD

This patent disclosure relates generally to an electrically powered traction powertrain that couples a traction motor to propulsion devices and, more specifically, to a lubrication system for delivering a lubricant to the transmission in the traction powertrain.

BACKGROUND

Mobile machines such as construction or mining machines typically have a powertrain that includes the components to generate and transmit motive power or torque between a prime mover to the point of utilization such as wheels or continuous tracks for propelling the mobile machine. Components of a powertrain may include drive shafts, transmissions, differentials, power takeoffs and other features for transmitting rotational power. Some of these components, for example, those that involve parts that move relative to each other, may require a fluid lubricant to assist in their proper operation. Therefore, the powertrain of a mobile machine may be operatively associated with a lubricant system that supplies the fluid lubricant to the components such as, for example, a transmission that can adjust and change the torque and/or speed characteristics of the transmitted power output.

In traditional types of mobile machines, the prime mover that generates and directs motive power to the powertrain is typically an internal combustion that can combust a hydrocarbon-based fuel and convert the chemical energy therein to mechanical power. In this arrangement, the mechanical power generated by the engine may also be used to power one or more fluid pumps associated with the lubricant system that can pressurize and direct lubricant to the components of the powertrain. Some mobile machines, however, instead of including an internal combustion engine, may utilize electricity as the power source. Electrical power may be provided from a battery or generator and can be transmitted to a traction motor operatively coupled to the propulsion devices. Even in an electrically powered mobile machine, various mechanical powertrain components such as a transmission may still be included that require lubrication to operate properly. The present disclosure is directed to a lubrication system and method for delivering lubricant to the components of a traction powertrain operating on electrical power and in which an internal combustion engine providing motive mechanical power or torque for the lubricant system is absent.

SUMMARY

The disclosure describes, in one aspect, a mobile machine including a traction powertrain configured to operate on electrical power and which includes a traction motor for converting electrical power to rotational motion. The traction powertrain further includes a transmission coupled by its transmission input to the traction motor by its transmission output to a propulsion device of the mobile machine. To provide lubricant to the transmission, the mobile machine includes a lubrication system with a lubrication pump configured to pressurize a liquid lubricant that is operatively coupled to a pump motor. To sense rotational motion within the traction powertrain, a powertrain sensor may be operatively associated with the traction powertrain and configured to generate and send a powertrain rotation signal to an electronic controller. The electronic controller is also associated with the lubrication system and is programmed to generate and communicate a first lubricant supply command indicative of a first lubricant quantity to the lubrication system that directs the lubricant pump to deliver a first lubricant quantity to the transmission.

In another aspect, the disclosure describes a method of operating a traction powertrain that operates on electrical power. According to the method, rotational motion is directed through a traction powertrain by a traction motor operatively coupled to a transmission input of a transmission and onto a propulsion device operatively coupled to a transmission output of the transmission. A powertrain sensor is used to monitor the rotational motion within the traction powertrain and can generate a powertrain rotation signal upon monitoring rotational motion in the traction powertrain. A first lubricant supply command can be generated in response to the powertrain rotation signal that is indicative of a first lubricant quantity to supply the first lubricant quantity to the transmission with a lubricant supply pump.

DETAILED DESCRIPTION

Figure 1:
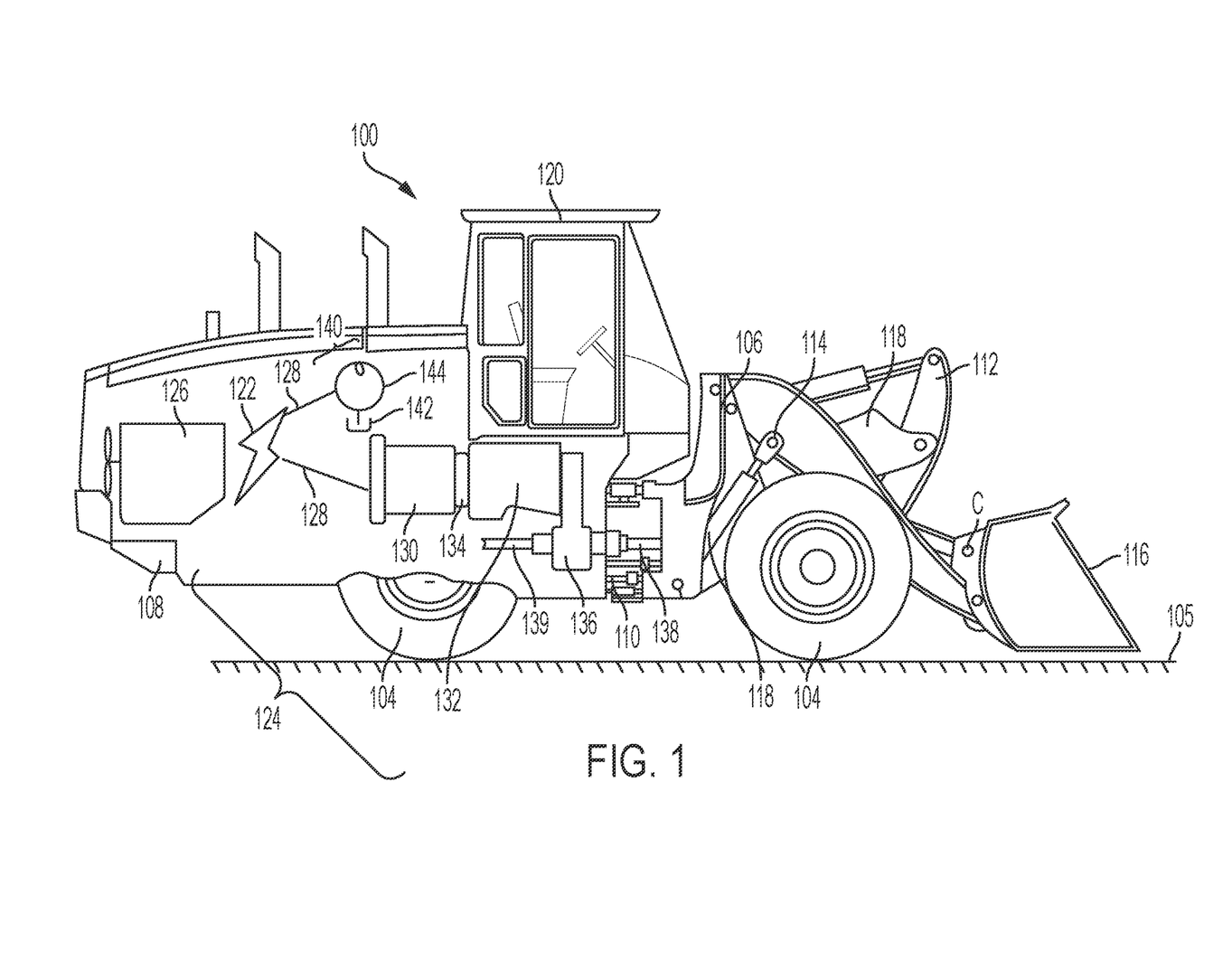
FIG. 1 is a side elevational view of a mobile machine such as a wheel loader that includes an electrically powered traction powertrain for transmitting power to a plurality of propulsion devices.

Now referring to the drawings, wherein whenever possible like reference numbers refer to like features, there is illustrated in FIG. 1 a mobile machine 100 in the embodiment of a wheel loader that may move or load materials such as rock, soil, or debris. The mobile machine 100 in the embodiment of a wheel loader may include a machine frame 102 that is supported on a plurality of propulsion devices 104 that contact the ground or another work surface 105. The propulsion devices 104 can receive motive power to propel the mobile machine 100 over the work surface 105. Examples of suitable propulsion devices 104 include wheels or continuous tracks. To change the direction of travel, the machine frame 102 may be an articulated frame including a forward frame end 106 and a rearward frame end 108 that are interconnected by an articulated joint 110 that enables the forward and rearward frame ends 106, 108 to articulate or pivot with respect to each other. Disposed on the forward frame end 106 can be a work implement such as a loading mechanism 112 that can be raised and lowered with respect to the work surface 105. The loading mechanism 112 can include one or more elongated lift arms 114 that are pivotally coupled to the forward frame end 106 at a proximal end and connected at the other distal end to a bucket 116 to accommodate material. To pivotally move the lift arms 114, the loading mechanism 112 can be operatively associated with one or more hydraulic actuators 118 such as hydraulic cylinders that can telescopically extend and retract by activation of pressurized hydraulic fluid.

To accommodate an operator, an elevated cab or operator station 120 can be supported on the rearward frame end 108 of the machine frame 102 in a position to provide visibility over the work surface 105. The operator station 120 can also accommodate various control devices and gauges for operating the mobile machine 100 such as steering wheels or joysticks, gears sticks, speedometers, and the like. In other embodiments, the mobile machine 100 can be configured for remote operation or autonomous or semi-autonomous operation. Although the mobile machine 100 in FIG. 1 is a wheel loader, aspects of the disclosure are applicable to other types of machines that may be used in construction, mining, or agriculture such as hauling trucks, motor graders, excavators, bulldozers, and the like and that may include work implements other than a loading mechanism 112 such as cranes, dump bodies, dozer blades, buckets, and the like.

To generate power for operation of the mobile machine 100 including, for example, to drive the propulsion devices, a prime mover that functions as the source of energy can be disposed on the rearward end frame 108. In accordance with the disclosure, the prime mover may be an electrical power source 122. The electrical power source 122 can be any suitable source of electrical energy that can provide and supply electrical power in the form of electrical current and voltage to a load. The electrical power source 122 can produce electrical power as either direct current or alternating current, and the alternating electrical current can be single phase or polyphase electricity. The electrical power source 122 can produce electrical power utilizing any suitable technology and operating principle include electromagnetic, thermodynamic, chemical, solar, etc.

To operatively couple the electrical power source 122 to the electrical loads on the mobile machine that convert the electrical power to work, the electrical power source may be operatively associated with or part of a powertrain. A powertrain may include electrical and mechanical devices that serve to transfer power and energy between a prime mover such as the electrical source and the load that corresponds to the point of application. For example, to deliver power to the propulsion devices 104 that provide traction and mobility with respect to the work surface 105, the mobile machine 100 can include a traction powertrain 124. The electrical power source 122 can operatively serve as the starting point or initial point of the traction power train 124 and the propulsion devices 104 can operatively serve as the terminal point of the traction powertrain 124. The traction powertrain 124 is therefore in part electrically powered.

In addition to the electrical power source 122, the traction power train 124 can be associated with additional prime movers as a source of energy and power for the mobile machine. An example of an additional prime mover may be an internal combustion engine 126. The internal combustion engine 126 combusts a hydrocarbon-based fuel to convert the chemical energy therein to generate rotational power or torque that the mobile machine 100 can harness for other work. Examples of suitable fuels include diesel, gasoline, natural gas, biofuels, etc. In addition to an internal combustion engine 126, other types of prime movers that may be used with the mobile machine 100 may include various types of engines, turbines, and other power generation devices.

In an embodiment, the electrical power source 122 can be a generator that is coupled to the output shaft of the internal combustion engine 126 to receive motive power in the form of rotational torque. A generator converts motive power embodied as rotational motion into electrical power in the form of alternating electrical current. Specifically, the electrical generator is an electromagnetic assembly in which permanent magnets or conductive field windings create a magnetic field and are rotated with respect to induction windings in which an electrical current is generated. An advantage of utilizing an electrical power source 122 as the prime mover for the traction powertrain 124 is to facilitate transmission and distribution of electrical power about the mobile machine 100 via one or more conduction circuits 128. For example, the conduction circuit 128 can communicate electrical power in proximity to the propulsion devices 104. To convert the electrical power generated by the electrical power source 122 to rotational motion and torque which the propulsion devices 104 can utilize, the electrically powered traction powertrain 124 can include a traction motor 130 electrically connected with the electrical power source 122. The traction motor 130 may be an electromagnetic assembly in which the electrical current is directed through conductive windings to generate a rotating magnetic field. The magnetic field can attract permanent magnets or magnetic materials disposed on a rotor causing rotation of the rotor as it follows the rotation of the magnetic field. The resulting rotational motion is output from a shaft protruding from the traction motor 130.

The traction powertrain 124 can include additional mechanical components that operatively connect the traction motor 130 with the propulsion devices 104. For example, to selectively adjust the rotational speed and/or rotational direction output from the traction motor 130, the traction powertrain 124 can include a transmission 132. The transmission 132 is coupled via a transmission input 134 with the output shaft from the traction motor 130 to receive the rotational motion and the associated torque. The adjusted rotational motion can be output from the transmission 132 by a transmission output 136 which can be a splined shaft or the like. In the embodiment where the mobile machine is wheel loader, to complete transmission of the rotational motion and torque to the propulsion devices 104, the transmission output 136 can be operatively connected to a front drive shaft 138 and a rear drive shaft 134. The traction powertrain 124 can also include differentials and axles to redirect and deliver rotational motion and torque accordingly to wheels or other propulsion devices.

In addition to generating and delivering power to the propulsion devices 104 via the traction powertrain 124, the electrical power source 122 can be used to power other systems on the mobile machine 100. For example, in the embodiment of a wheel loader having a lifting mechanism 114 that can be raised and lowered with respect to the work surface 105, the mobile machine 100 can include a hydraulic system 140 to provide pressurized hydraulic fluid for the hydraulic actuators 118. The hydraulic system 140 can include a tank or reservoir 142 and one or more hydraulic pumps 144 that are electrically powered and that are in electrical communication with the electrical power source 122 to receive electrical power there from. The hydraulic pumps 144 can pressurize and direct hydraulic fluid to the hydraulic actuators 118 via a suitable conduct like flexible hoses or rigid pipes. In addition to providing hydraulic fluid to the actuators, the hydraulic system may provide hydraulic fluid as a motive force and/or as a lubricant for other systems and devices associated with the mobile machine 100.

Figure 2:
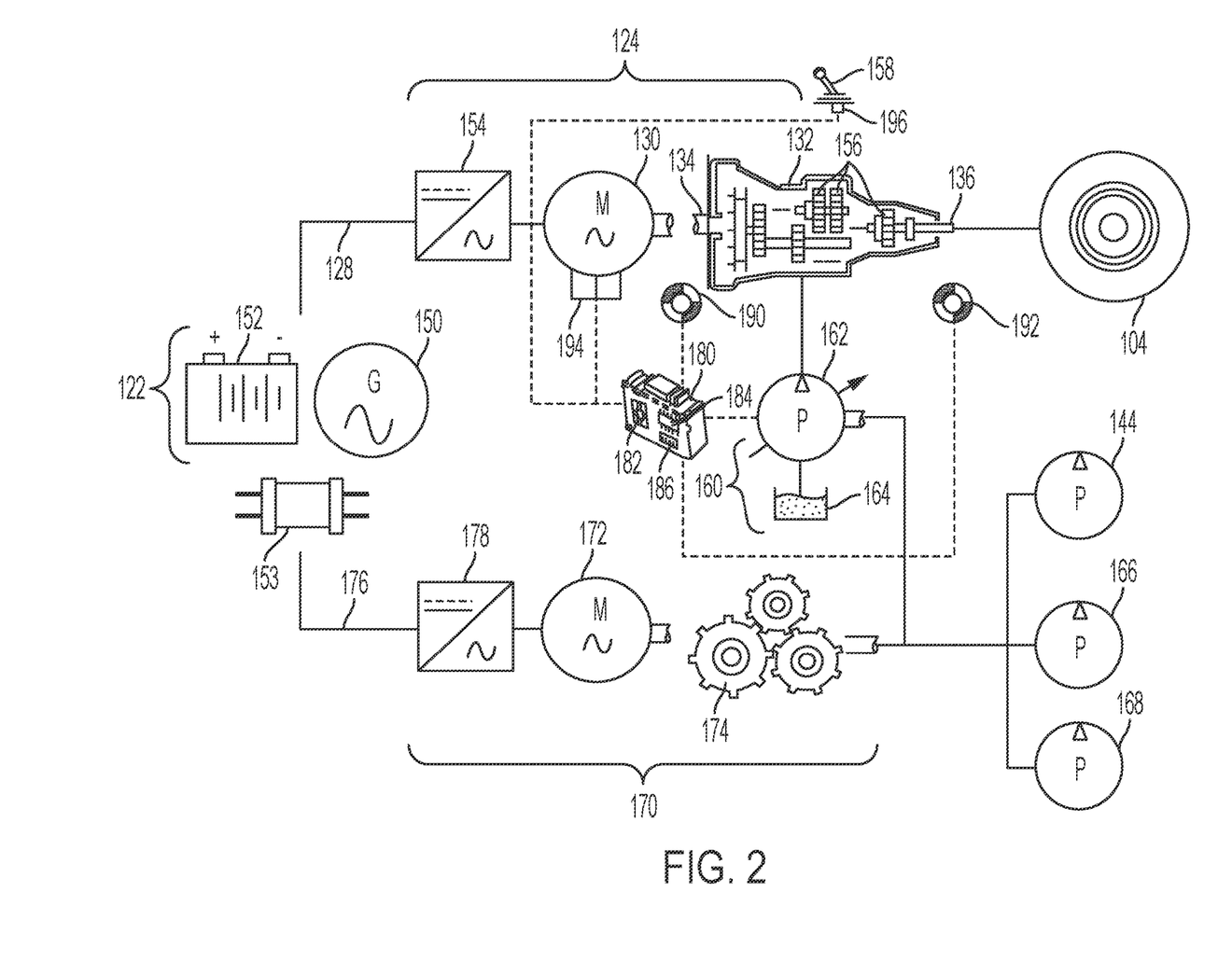
FIG. 2 is a schematic representation of a lubricant system operatively associated with pump powertrain in a parallel arrangement with the traction powertrain of the mobile machine.

Referring to FIG. 2, there is schematically illustrated a further embodiment of the electrically powered traction powertrain 124 in a parallel operative relation with other systems of the mobile machine 100. In the present embodiment, electrical power can be generated by the electrical power source 122 that is source of power for the traction powertrain 124 can have any suitable design and operating principle. For example, the electrical power source can be an electrical generator 150, which is similar to a motor with an electromagnetic assembly that converts motive power into electrical power in the form of alternating electrical current. Specifically, the electrical generator 150 is an electromagnetic assembly in which permanent magnets or conductive field windings create a magnetic field and are rotated with respect to induction windings in which an electrical current is generated. In another example, the electrical power source 122 can be a battery 152 producing direct current via an electrochemical reaction. In yet another example, the electrical power source can be a fuel cell 153 that converts a chemical energy of a fuel into electrical energy. In further examples, the electrical power source 122 can be configured as a hybrid system using energy from both electrical and mechanical sources.

The electrical power generated by the electrical power source 122 is transmitted by the conduction circuit 128 which may comprise conductive wires, power cables, and the like to different points of application. In the event direct current is generated by the electrical power source 122, a power converter 154 can be included as part of the electrically powered traction powertrain 124 to convert the direct current to alternating current with the electrical polarity periodically alternating and that can be better utilized by the traction motor 130. The frequency of the alternating current from the power converter 154 may determine the operating speed of the traction motor 130. The traction powertrain 124 may include other electrical devices such as voltage convertors, transformers, etc. to further adjust the electrical power transmitted in the conduction circuit 128.

In an embodiment, the transmission 132 may include a plurality of internal engageable gears 156 that can be selectively engaged and disengaged in various gear ratios thereby adjusting the rotational speed and torque output from the traction motor 130. As will be appreciated by those of skill in the art, changing rotational speed, measured in RPMs for example, results in an inverse change in the torque, measured in foot-pounds for example. The engageable gears 156 may have different diameters and different numbers of gear teeth protruding about their diameter. The diameters and tooth number can be such that when two different engageable gears 156 are intermeshed together, they will rotate at different rotational speeds. The transmission 132 can be configured with any suitable number of predetermined or fixed gear pairings of the engageable gears 156 that represent the different speed ratios of the adjusted rotational speed between the transmission input 134 and the rotational speed at the transmission output 136. The transmission 132 can also be arranged to reverse the rotational motion to, for example, drive the mobile machine 100 in forward or reverse. The transmission 132 may include clutches or the like that can disconnect the transmission input 134 and the transmission output 136 and place the transmission 132 in a neutral configuration so that torque or rotational power cannot be transmitted there through. In other embodiments, the transmission 132 can be a continuously variable transmission that adjusts rotational motion in a continuous manner using planetary gears for example. To enable an operator to selectively engage the plurality of engageable gears 156, the transmission 132 can be operatively associated with a gear selector 158 such as a gear shift.

Because the intermeshed engageable gears 156 of the transmission 132 rotate in contact together, it can be useful to supply a fluid lubricant to the transmission and thereby reduce friction and wear between the gears. Therefore, the transmission 132 can be operatively associated with a lubrication system 160 having a lubricant pump 162 and a lubricant reservoir 164. The lubricant reservoir 164 can be a vented or enclosed tank that accommodates the fluid lubricant which the lubricant pump 162 can pressurize and direct to the transmission 132 via conduits like flexible tubing or rigid pipes. The lubricant pump 162 can be any suitable type of mechanical fluid pump including, for example, a gear pump that can cause pressurized flow of a fluid. The lubricant pump 162 can have the same or different construction or operating design as the hydraulic pump 144 for the lift mechanism or another work implement as described above. In an embodiment, in addition to the lubricant pump 162 and hydraulic pump 144, there may be additional fluid pumps to supply working fluids to other systems of the mobile machine such as a brake pump 166 and a steering oil pump 168.

To provide a motive force to power the lubricant pump 162 and the other pumps, the mobile machine 100 can include a pump powertrain 170 in addition to the traction powertrain 124. The pump powertrain 170 can be arranged in parallel with the traction powertrain 124 and can also be configured to transmit electrical power or mechanical power in the form of rotational torque. For example, the pump powertrain 170 can include a pump motor 172 that can be operatively associated with the lubricant system 160. The pump motor 172 can be an electromechanical device that converts electric power to rotational motion and torque. In the illustrated embodiment, to distribute the rotational power output from the pump motor 172 into multiple rotational outputs for the plurality of pumps, a pump gearbox 174 can be included. The pump gearbox 174 can be operatively coupled to the lubricant pump 162, brake pump 166, steering oil pump 168, etc., to distribute the rotational motion and torque thereto via, for example, a plurality of shafts and clutches. In other embodiments, the pump motor 172 can be directly coupled to the lubricant pump 162.

To provide electrical power for operation, the pump motor 172 can be electrically connected or associated in common with the electrical power source 122 that supplies electrical power to the traction motor 130. For example, the pump motor 172 can be connected through a second conductive circuit 176 to the battery 152. To modulate or adjust the electrical power transmitted to the pump motor 172, a second power convertor 178 or similar electrical devices can be disposed in the second conductive circuit 176.

In the illustrated embodiment, the traction motor 130 operatively coupled to the transmission 132 is physically separate and distinct from the pump motor 172 associated with the lubricant system 160. More particularly, the traction motor 130 and the pump motor 172 are arranged in parallel with the first conductive circuit 128 and the second conductive circuit 176 forming parallel electrical circuits. Therefore, the traction motor 130 operating and controlling the angular speed of rotational motion transmitted to the transmission input 134 of the transmission 132 and the pump motor 172 operating the lubricant pump 162 are operatively disassociated with respect to each other. Relatedly, the operating conditions in the transmission 132 do not have a direct relation or association with the pump motor 172 operating the lubricant pump 162. In other words, in the absence of a direct mechanical linkage between the lubrication system 160 and the traction powertrain 124, the lubricant pump 162 cannot directly respond to the operating conditions in the transmission 132 including the rotating motion transmitted there through and the transmission may be starved of lubricant when needed. Further, the traction motor 130 and its associated power convertor 154 and the pump motor 172 and its associated power convertor 178 may be configured to respond differently and at different angular speeds.

The lubrication system 160 can therefore be arranged to coordinate or synchronize operation between the pump motor 172 associated with the lubricant pump 162 and the transmission 132 operatively coupled with the traction motor 130. To facilitate controlled coordination between the systems, the lubrication system 160 can be operatively associated with an electronic controller 180, also referred to as electronic control module (ECM) or an electronic control unit (ECU). The electronic controller 180 can include various circuitry components in any suitable computer architecture for receiving and processing data and software to operate. The electronic controller 180 can process and execute different functions, steps, routines, and instructions written as computer readable software programs and may use data from sources such as data tables, charts, data maps, lookup tables and the like. Additionally, the electronic controller 180 can be responsible for processing functions associated with various other systems on the mobile machine. While the electronic controller 180 is illustrated as a standalone device, its functions may be distributed among a plurality of distinct and separate components.

For example, the electronic controller 180 can include one or more microprocessors 182 such as a central processing unit (CPU), an application specific integrated circuit (ASIC), or a field programmable gate array (FPGA) comprising a plurality of transistors and similar circuits that are capable of reading, manipulating and outputting data in electronic form. The electronic controller 180 can include non-transient programmable memory 184 or other data storage capabilities that may be in random access memory or more permanent non-volatile forms of data storage media. Common examples of computer-readable memory 184 include RAM, PROM, and EPROM, a FLASH-EPROM, and any other memory chip or cartridge. The memory is capable of storing in software form the programming instructions and the data that can be read and processed by the microprocessor 182. The software and data may take the form of instruction sets, programs, applications, routines, libraries, databases, lookup tables, data sets, and the like. To communicate with other instruments and actuators associated with the traction motor 130 and/or the lubrication system 160, the electronic controller 180 can include various input/output ports 186 and related circuitry. Communication may be established by sending and receiving digital or analog signals across electronic communication lines or communication busses using any suitable data communication protocols, including wireless protocols. The various communication and command channels are indicated in dashed lines for illustration purposes.

By way of example, the electronic controller 180 can be in electronic communication with one or more powertrain sensors, measurement instruments, or controls that are operatively associated with the traction powertrain 124. For example, to determine the input to the transmission 132, a transmission input sensor 190 can be operatively associated with the transmission input 134. The transmission input sensor 190 may be a rotational sensor such as rotary encoder sensing rotational motion input to the transmission 132. The transmission input sensor 190 may also be configured to sense the angular speed, i.e., the speed of rotation associated with the rotational motion, in RPM. The transmission input sensor 190 may be in tangential contact with a splined shaft associated with the transmission input 134 so as to rotate therewith and can electronically communicate the angular speed in RPM to the electronic controller 180. In other embodiments, the transmission input sensor 190 may be a more complex sensor and may be capable of estimating the torque or rotational power input to the transmission 132. To determine the output of the transmission 132, a transmission output sensor 192 of similar design can be operatively associated with the transmission output 136 and in electronic communication with the electronic controller 180.

To sense if the traction motor 130 is operating or generating rotational motion or torque, a motor rotation sensor 194 can be operatively associated with the traction motor 130 and in electronic communication with the electronic controller 180. In an embodiment, the motor rotation sensor 194 can be another rotation sensor like a rotary encoder that directly senses the rotational output of the traction motor 130. In other embodiments, the motor rotation sensor 194 can indirectly measure the rotational output of the traction motor 130. For example, the motor rotation sensor 194 can measure the electrical characteristics or operation of the traction motor 130 like voltage or current draw and can infer or estimate the mechanical performance output by the traction motor. The motor rotation sensor 194 may be able to measure the rotational motion associated with the traction motor 130 in terms of angular speed and torque.

To assess or determine the operational settings for the transmission 132, a selected gear sensor 196 can be associated with the gear selector 158 such as a gear stick. In another embodiment, the selected gear sensor 196 can be directly associated with the transmission 132 to monitor the gear ratio of the engageable gears 156 therein. The gear selector 158 can be used to select different gear ratios of the engageable gears 156 in the transmission which determine the adjustment ratio between the angular speed and torque at the transmission input 134 and the transmission output 136. Further, the selected gear sensor 196 may determine if the transmission 132 is in the neutral configuration, and the transmission input sensor 190 and transmission output sensor 192 can determine whether rotational motion or torque is being transmitted through the transmission 132.

INDUSTRIAL APPLICABILITY

Figure 3:
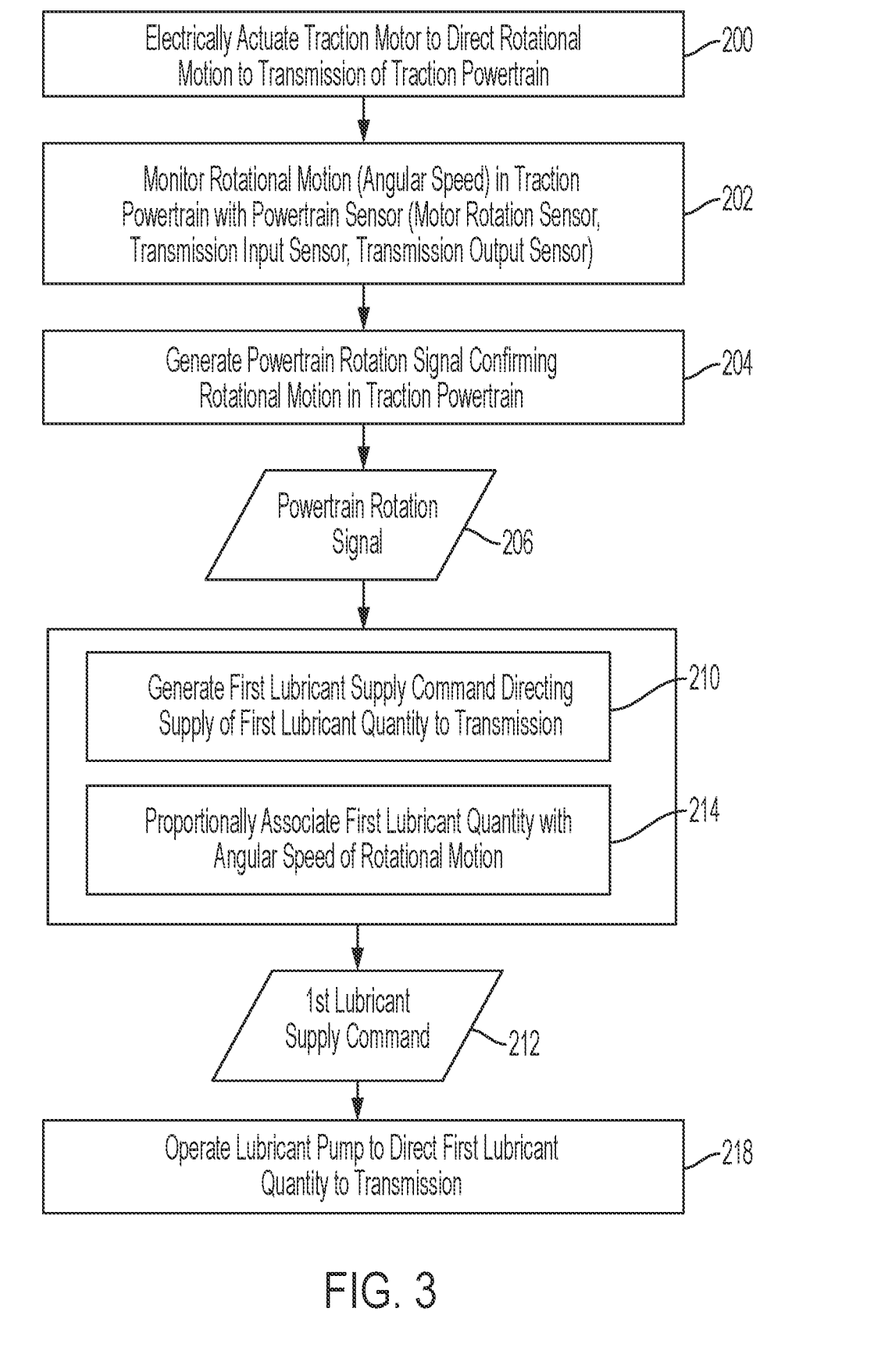
FIG. 3 is a flow diagram of a possible method in such as a routine, process, or series of steps that the lubricant system may conduct to deliver a quantity of lubricant to the components of the traction powertrain.

Referring to FIG. 3, with continued reference to the preceding figures, there is illustrated an embodiment of a method of operating an electrically powered traction powertrain 124 according to the arrangements and embodiments described herein. For example, the traction powertrain 124 may include a traction motor 130 operatively coupled to a transmission 132. To provide lubricant to the transmission 132 (and possibly other systems, not shown), there may also be a lubrication system 160 including a lubricant pump 162 that is operatively associated with a pump powertrain 170. The traction motor 130 for the transmission 132 and the pump motor 172 for the lubricant pump 162 are electrically arranged in parallel and are respectively included in parallel first and second conductive circuits 128, 176. Moreover, the traction motor 130 and the pump motor 172 can be electrically connected to and receive electrical power in common from an electrical power source 122. The following method can be embodied as a computer software program written in a programming language and executable by the electronic controller 180.

To transmit power for propelling the mobile machine 100, in an electrical actuation step 200, electrical power can be directed to electrically actuate the traction motor 130 to generate rotational motion and torque. The rotational motion and torque can be directed to the transmission input 134 of the transmission 132 to adjust the speed ratio or torque and the adjusted rotational motion and torque are output at the transmission output 136 toward the propulsion devices 104.

To regulate the lubrication system 160 and direct lubricant to the transmission 132, in a powertrain monitoring step 202, the electronic controller 180 monitors the rotation motion transmitted through the traction powertrain 124. Rotational motion can be monitored at different locations along the traction powertrain 124 and can be done with any of the foregoing powertrain sensors including the transmission input sensor 190, the transmission output sensor 192, and/or the motor rotation sensor 198. The powertrain sensors may further measure the angular speed in, for example, RPM associated with the rotational motion in the traction powertrain 124. In response to sensing any rotational motion within the traction powertrain 124, the powertrain rotation sensors can, in a signal generation step 204, generate and send a powertrain rotation signal 206 to the electronic controller 180. The powertrain rotation signal 206 can be embodied as a digital data signal affirming the presence of rotational motion in the traction powertrain 124.

Upon receiving the powertrain rotation signal 206, the electronic controller 180 can undertake actions to lubricate the transmission 132. For example, the electronic controller 180 in a command generation step 210 can generate a first lubricant supply command 212 directing the lubrication system 160 to deliver lubricant to the transmission 132. The first lubricant supply command 212 can be associated with a first lubricant quantity which may be a fixed or variable amount and can account for or depend in part upon the size and design of the transmission 132. In an embodiment, the command generation step 210 may utilize the largest measured value of the rotational motion sensed by any of the plurality of powertrain sensors to assess rotational motion in the traction powertrain 124. For example, the command generation step 210 may compare the powertrain rotation signals 206 from the plurality of powertrain sensors and select the largest value to calculate the first lubricant supply command 212. In an embodiment, the first lubricant supply command 212 can be variable and can be proportional to the angular speed of the rotational motion transmitted within the traction powertrain 124. For example, in an association step 214 that may occur in conjunction with the command generation step 210, the electronic controller 180 can modify the first lubricant quantity in proportion with the angular speed such that, at faster speed, a greater quantity of lubricant is directed to the transmission 132.

The first lubricant supply command 212 may be communicated to the pump powertrain 170 and, in a pump operation command 218, may function in any suitable manner to cause the lubricant pump 162 to direct the desired first lubricant quantity to the transmission 132. For example, the first lubricant supply command 212 can be received directly by the pump motor 172 and can control the output speed of the pump motor that is operatively associated with the lubricant pump 162. In another embodiment, the lubricant pump 162 can be a variable displacement pump and the first lubricant command 212 can adjust the displacement and thus the quantity or volume of lubricant pressurized and discharged by the lubricant pump 162. The transmission 132 can fluidly receive the first lubricant quantity via fluid conduits like tubing or pipes to ensure the selectively engageable gears therein are lubricated.

Figure 4:
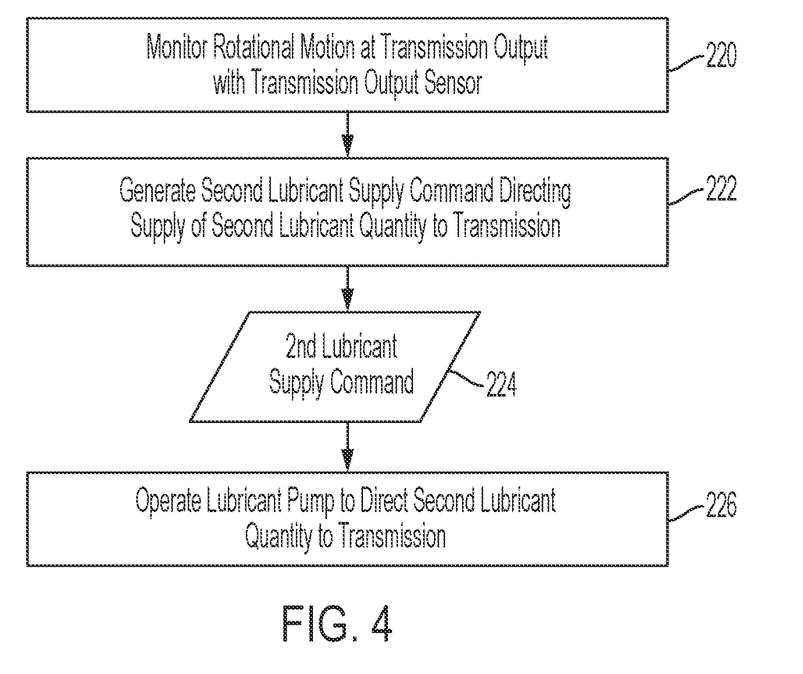
FIG. 4 is another embodiment of the flow diagram of FIG. 3 configured to deliver a quantity of lubrication to the components of the traction powertrain if the mobile machine is coasting.

Referring to FIG. 4, there is illustrated a further embodiment of the method for operating a traction powertrain 124 that is configured to address certain operating conditions of the mobile machine 100, such as when the transmission 132 is in the neutral configuration and mobile machine 100 is coasting. In such a situation, the traction motor 130 may not be electrically actuated or, in other words, may be turned off and may not be generating and transmitting rotational motion and torque to the traction powertrain 124. However, if the mobile machine 100 is coasting and the propulsion devices 104 are still moving, rotational motion may still be directed back into the traction powertrain 124. If the engageable gears 154 are still meshed or freely rotating, it may be useful to ensure fresh lubricant is still directed to and received by the transmission to reduce friction and wear of the gears.

Accordingly, in a transmission output monitoring step 220, the transmission output sensor 192 associated with the transmission output 136 may monitor rotational motion present at the transmission output 136. This may occur specifically if the mobile machine is coasting even if the traction motor 130 and the transmission 132 are in the neutral configuration. In the event the transmission output sensor 192 senses any rotational motion at the transmission output 136, it can electronically communicate with the electronic controller 180. The electronic controller may, in a signal generation step 222, generate a second lubricant supply command 224. The second lubricant supply command 224 can be associated with a second lubricant quantity that can be a fixed or variable amount. The second lubricant supply quantity can represent a minimal or default quantity of lubricant useful for the transmission 132 to accommodate rotational motion during coasting or similar events. In a pump operation step 226, the second lubricant supply command 224 is directed from the electronic controller 180 to the pump powertrain 170 and causes the lubricant pump 162 to direct the second lubricant quantity to the transmission 132.

Figure 5:
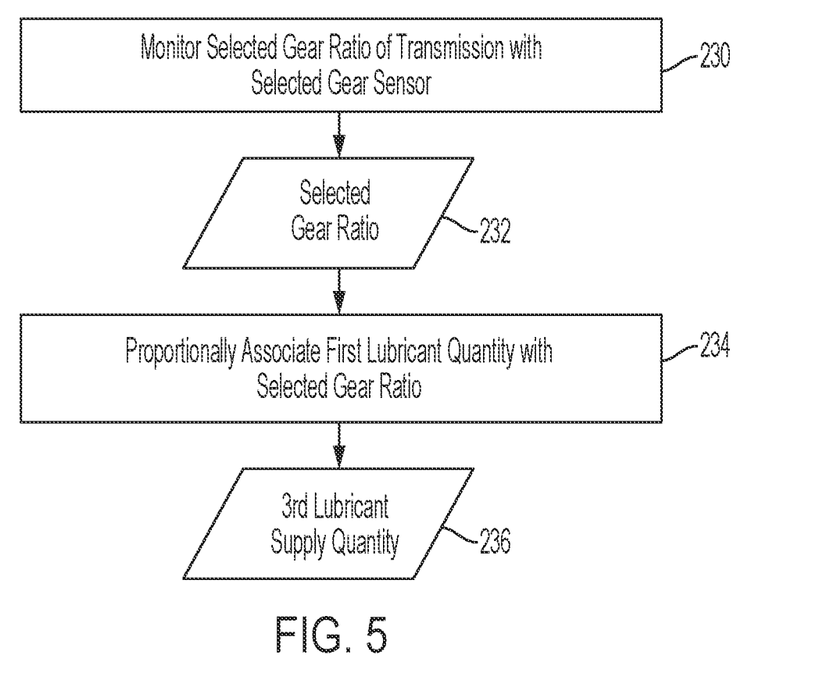
FIG. 5 is another embodiment of the flow diagram of FIG. 3 configured to deliver a quantity of lubrication to the components of the traction powertrain that may account for or accommodate operative settings of the traction powertrain.

Referring to FIG. 5, there is illustrated an embodiment in which the method of operating a traction powertrain 124 accounts for operational settings of the transmission 132. For example, in a selected gear monitoring step 230, the method may determine in which of the plurality of selectable gear ratios the plurality of engageable gears 156 in the transmission 132 are presently set or placed. The selected gear ratio 232 of the plurality of engageable gears 156 may affect the quantity of lubricant that should be delivered to the transmission 132. A particularly high gear ratio may necessitate a larger quantity of lubricant. To conduct the selected gear monitoring step 230, the selected gear sensor 196 associated with the gear selector 158 can be used. The selected gear ratio 232 can be communicated to the electronic controller 180 that, in another association step 234, can generate a third lubricant supply command 236 directing a third lubricant quantity to the transmission 132. In further embodiments, in addition to the selected gear ratio 232, the electronic controller 180 may receive and assess additional inputs regarding operational settings for the traction powertrain 124 and/or transmission 132 in the association step 234 when assessing and associating the third lubricant supply command 236 to determine the proper quantity of lubricant for the transmission.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A mobile machine comprising a traction powertrain configured for electrical power and including a traction motor for converting electrical power to rotational motion, a transmission having a transmission input operatively coupled to the traction motor and a transmission output operatively coupled to a machine propulsion device;
    a lubrication system including a lubrication pump configured to pressurize a liquid lubricant and operatively coupled to a pump motor;
    a transmission input sensor operatively associated with the transmission input, the transmission input sensor configured to generate and send a first powertrain rotational signal upon monitoring rotational motion of the transmission input;
    and an electronic controller operatively associated with the lubrication system and in electronic communication with the transmission input sensor and with the transmission output sensor;
    whereupon the electronic controller is programmed to generate and communicate: a first lubricant supply command indicative of a first lubricant quantity to the lubrication system directing the lubricant pump to deliver the first lubricant quantity to the transmission, the first lubricant quantity varying in relation to the first powertrain rotational signal from the transmission input sensor;
    a second lubricant supply command indicative of a second lubricant quantity to the lubricant system in response to the transmission output signal, wherein the second lubricant quantity is a fixed default quantity of lubricant when the transmission is in a neutral configuration and the mobile machine is coasting.

2. The mobile machine of claim 1, wherein the traction motor and the pump motor receive in common electrical power from an electrical power source.

3. The mobile machine of claim 2, wherein the traction motor and the pump motor are electrically arranged in parallel.

4. The mobile machine of claim 1, wherein the powertrain rotation signal generated by powertrain sensor indicates an angular speed associated with the rotational motion transmitted in the traction powertrain.

5. The mobile machine of claim 1, further comprising a selected gear sensor in electronic communication with the electronic controller and the electronic controller is programmed to generate and communicate a third lubricant supply command indicative of a third lubricant quantity based upon a selected gear ratio of the transmission.

6. The mobile machine of claim 1, further comprising a pump gearbox operatively disposed between the lubricant pump and the pump motor.

7. The mobile machine of claim 6, wherein the pump gearbox is operatively coupled to a plurality of fluid pumps.

8. The mobile machine of claim 1, wherein an electrical power source is selected from a group comprising a battery, a fuel cell, and an electric generator.

9. A method of operating a traction powertrain utilizing electrical power on a mobile machine comprising: directing rotational motion through a traction powertrain with a traction motor operatively coupled to a transmission input of a transmission;
    directing rotation motion to a propulsion device operatively coupled to a transmission output of the transmission;
    monitoring rotational motion within the traction powertrain with a transmission input sensor associated with the transmission input; generating a powertrain rotational signal upon monitoring rotational motion with the transmission input sensor;
    generating a first lubricant supply command indicative of a first lubricant quantity to supply the first lubricant quantity to the transmission in varying relation to the powertrain rotational signal; and operating a lubricant pump operatively coupled to a pump motor to supply the first lubricant quantity to the transmission;
    ceasing direction of rotational motion through a traction powertrain with a traction motor;
    coasting the mobile machine to direct rotational motion to the transmission output;
    monitoring rotational motion at the transmission output with a transmission output sensor; and generating a second lubricant supply command indicative of a second lubricant quantity that is a fixed default quantity to supply the second lubricant quantity to the transmission in response to coasting of the mobile machine when the transmission is in a neutral configuration.

10. The method of claim 9, further comprising directing electrical power to the traction motor and directing the electrical power to the pump motor from an electrical power source electrically coupled in common to the traction motor and the pump motor.

11. The method of claim 10, wherein the traction motor and the pump motor are electrically arranged in parallel.

12. The method of claim 9, wherein the powertrain rotation signal indicates an angular speed of the rotational motion transmitted in the traction powertrain.

13. The method of claim 12, further comprising generating the first lubricant supply command indicative of the first lubricant quantity in relation to the angular speed.

* * * * *